RECORD PLAYER FOR BOTH SIDES OF A RECORD

Filed Jan. 15, 1962 2 Sheets-Sheet 1

INVENTOR
Jacob Rabinow
BY Joseph A. Genovese & Max L. Libman
ATTORNEYS

Oct. 29, 1963 J. RABINOW 3,108,812

RECORD PLAYER FOR BOTH SIDES OF A RECORD

Filed Jan. 15, 1962 2 Sheets-Sheet 2

INVENTOR

Jacob Rabinow

BY Joseph A. Genovese & Max L. Libman

ATTORNEYS

United States Patent Office 3,108,812

Patented Oct. 29, 1963

3,108,812

RECORD PLAYER FOR BOTH SIDES OF A RECORD

Jacob Rabinow, Takoma Park, Md., assignor to Rabinow Engineering Co., Inc., Rockville, Md.

Filed Jan. 15, 1962, Ser. No. 166,070

16 Claims. (Cl. 274—39)

This invention relates to record players and particularly to a record player for successively playing opposite sides of a record without turning over the record.

The advantages of a machine capable of playing successive sides of the single record are very well known. Certain advantages accrue whether the record player is used commercially (a coin-controlled machine) or non-commercially, for instance in the home. There are commercial machines which play either side of the record when the record is held vertically by a pair of grippers engaging the label-area of the record. The Acker U.S. Patent No. 2,937,026 discloses a record player operating somewhat like many coin-controlled record players.

A large number of prior patents disclose record players with a single tone arm having two styli disposed between a pair of records, and the styli track the grooves of successive sides of the record. The Wilbur Patent No. 2,555,910, Hoffman Patent No. 2,665,917, and Fisher Patent No. 2,550,794 are examples of this type of record player. The Wilbur and Hoffman patents disclose record players where one side of the record is played while it is on a turntable and the other side is played while it is peripherally supported on wheels, at least one of which is a driver. The Fisher phonograph supports the record on wheels near the periphery of the record for both playings of the two sides of a record. The Nicole et al. Patent No. 2,592,323 discloses a record player similar to the Wilbur machine to the extent that one side of the record is played while it is supported on a turntable (or the top of the stack of records on the turntable), and the other side of the record is played while it is supported on a small dog which protrudes from the side of the spindle for a group of records.

Another kind of record player is exemplified by the Morris Patent No. 2,658,761, where both sides of the record are successively or selectively played by two tone arms. During the playing of the record, it is held between a pair of grippers which engage the label-area of the record. The Morris record player and the record player disclosed in all of the previous patents mentioned above, are capable of playing a record on either side without turning over the record as is required in the great majority of commercially available record players. My invention, too, provides a record player where both sides of the record may be successively played without turning over the record to accomplish this. However, all prior record players of this general type of which I am aware, use no turntable at all or a turntable while only one side of the record is being played. An object of my invention is to provide a record player of the type under consideration, where the record is engaged with a turntable during the playing of successive or either side of the record.

There are inherent difficulties in playing a record which is supported solely by grippers at the label-area, as in the Morris patent. For instance, as the stylus tracks the record groove, the large unsupported area of the record can vibrate, especially where the record groove is heavily modulated. This type of vibration, i.e. vibration of the record itself, does not occur when the record is supported on a turntable. The same kind of difficulty and others are encountered when the record is supported by wheels near the outer edge of the record, for instance as in the Wilbur record player. The recent development of fine groove records, and particularly stereo records, has made this important as explained below.

As record speeds have been reduced and the packing density of the grooves increased, the amplitudes of motion delivered to the stylus have been constantly decreased so that the stylus-amplifier sensitivity has been constantly increased to a point where the combination of stylus and amplifier forms an excellent microphone device. In the past when pickups had to pick up only the transverse motion of the stylus tip, vibration of the record perpendicular to its own plane produced relatively little output. All this has been changed with the stereo record. Now the pickup is sensitive to perpendicular motion and this is the mode in which unsupported records can vibrate most freely. In order to eliminate this vibration it is very important that the records be held flat against both a heavier mass and a damping material. Vibrations of a record produce, at worst, a loud howl and, at best, a considerable amount of distortion.

It is interesting to note here that the old hill-and-dale record would also have given rise to this problem except that those records were not generally used in the home, but were confined almost exclusively to studio work and were always supported by large turntables, generally disassociated physically from loud speakers which reproduced the music.

Another advantage in using a turntable is the flywheel action of the turntable. This is not present in peripherially supported records, nor appreciably present in records which are supported by clamps at the label-area thereof.

There are prior systems where two separate turntables are used, one along side of the other, and the record is physically turned over when it is moved from one turntable to the other. However, this type of record player has the objectionable requirement of a large volume for the record to sweep as it is moved from one turntable to the other. Compactness is sacrificed in such systems.

The further object of my invention is to provide the advantages and benefits of a two-turntable system without the disadvantage of requiring a large volume to be swept out by the record as it is placed on successive turntables.

Another object of my invention is to support the record by a relatively large area to avoid damaging the record as is often the case by fingers or dogs which support the records in record players of this general type.

The term "label area" as used herein is defined as the central portion of a record, i.e. that area which generally supports the label of the record.

Other objects and features will become apparent in following the description of the illustrated forms of my invention.

Figure 1:
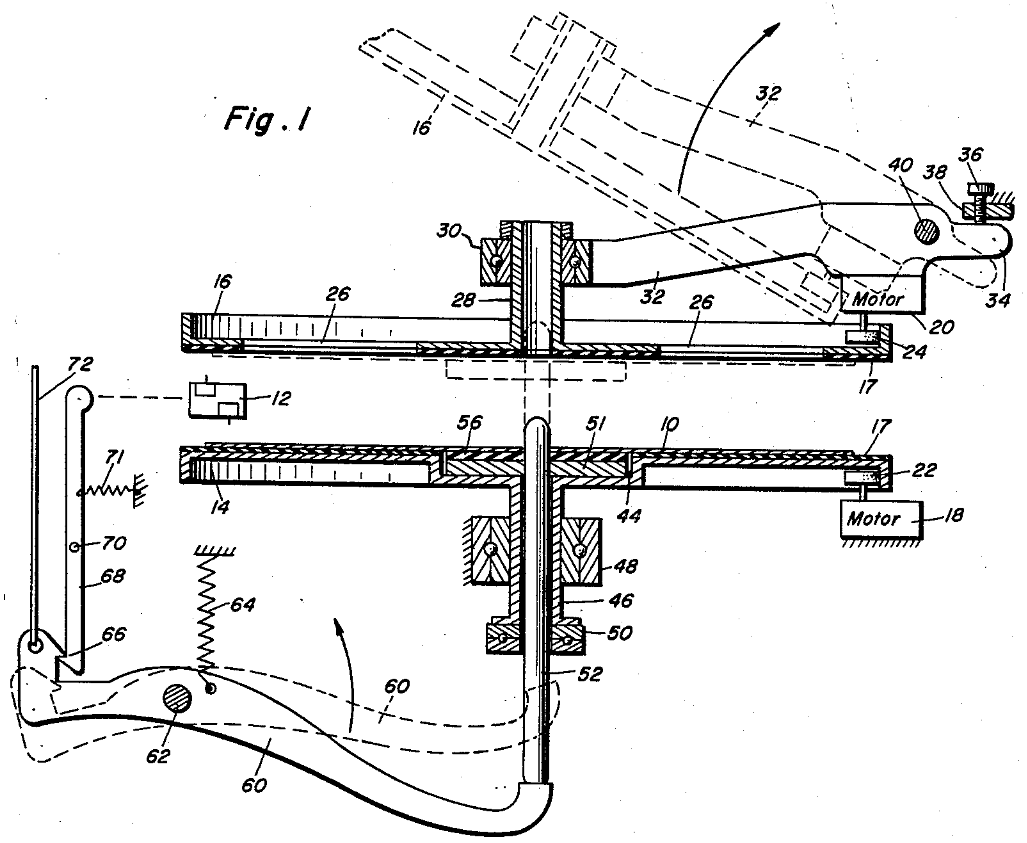
FIGURE 1 is a partially diagrammatic vertical sectional view of a record player in accordance with my invention.

In accompanying drawings FIGURE 1 shows the horizontal form of my record player, that is, where the record player is best used to play a horizontally disposed record 10. The tone arm 12 and its operating mechanism (not shown) can be the same as a tone arm in many of the previously mentioned prior patents or the same as in my prior Patent No. 2,915,315 which is a straight-line servo arm for phonograph pickups. However, if my servo arm is used, certain modifications are required to incorporate two styli, for example, as in the Wilbur Patent No.

2,555,910. For the purpose of my present invention it is assumed that the tone arm and tone arm operating mechanism is conventional. I have two turntables 14 and 16, each driven by its motor 18 and 20, respectively, suitably coupled to each turntable, for instance by drive wheels 22 and 24 engaging peripheral flanges on the turntables. The upper turntable 16 has a flat, soft and resilient (e.g. rubber) record-engaging surface 17 and if desired, sight openings 26 can be formed in the turntable. Hollow spindle 28 is attached to the center of turntable 16 and is supported by a bearing assembly 30 at the end of an arm 32. The opposite end 34 of the arm engages an adjustable stop 36 attached to a stationary part 38 of the record player. Arm 32, and hence turntable 16, are capable of swinging about pivot 40 (as shown in dotted lines) thereby elevating the turntable to facilitate placing and removing record 10 on turntable 14. Motor 20 can be attached directly to arm 32 (shown) so that it swings up and down with the turntable, or it can be stationarily mounted (not shown) with roller 24 engaging the outer surface of the turntable flange.

Lower turntable 14 (also having a soft surface pad 17) has an upwardly opening recess or pocket 44 at its center, and a hollow mounting spindle 46 attached to the turntable at its center. Bearings 48 and 50 mount spindle 46 so that turntable 14 is free to rotate when driven by motor 18. An axially movable spindle 52 is disposed in the bore of hollow spindle 46 and has a clamp disc 51 near one end. The clamp disc 51 is fixed to spindle 52, or made integral therewith. Optionally, friction pad 56 is adhered to the surface of disc 51. The clamp disc 51 is so dimensioned that it is capable of receding into recess 44 (shown), and the width of the clamp is so dimensioned that it engages only the label area of typical record 10.

I have a mechanism for raising and lowering the clamp member 51 to respectively hold record 10 against upper turntable 16 and to lower record 10 so that it rests on lower turntable 14. The clamp member actuating mechanism is diagrammatically shown as a lever 60 mounted on a pivot 62 and having one end engaging the lower end of spindle 52. To reduce friction, a ball bearing can be interposed between the spindle 52 and lever 60 and held captive by either of these members. Spring 64 anchored at one end, and attached to lever 60 at the other end normally biases lever 60 upwardly at the spindle 52 contacting end. Lever 60 is held in the position shown in full lines by latch 66 formed of engaging dogs at one end of lever 60 and the adjacent end of a latch-release arm 68. Arm 68 is mounted for pivotal movement on a pivot pin 70 and held in the latch-engaging position by means of spring 71.

The operation of this form of my invention is as follows:

Record 10 is placed on turntable 14 when clamp 51 is in the lowered position (shown). The upper turntable 16 can be swung to the dotted line position to facilitate placing the record on turntable 14 or the upper turntable can be stationarily maintained in a horizontal plane and the record 10 slipped into the space between turntables at an edge thereof. In the latter case, the pivotal feature of turntable 16 can be omitted.

After the record is placed on turntable 14, the motor 18 is operated thereby rotating turntable 14, and the tone arm assembly is actuated so that the lower stylus tracks the record groove. The controls for motor 18 and the tone arm mechanism form no part of my present invention.

When the top side (as shown) of record 10 has been played the tone arm moves to the left and engages the upper end of latch lever 68 thereby releasing latch 66 and allowing spring 64 to elevate lever 60. This movement of lever 60 raises the clamp member 51 thereby lifting record 10 against the surface of turntable 16 and holding the record pressed (by the force of spring 64) against this turntable. Now the lower side of record 10 can be played by operating motor 20, and the tone arm mechanism. It is evident that the controls for motors 18 and 20 and also for the tone arm mechanism may be such that after one side of the record is played the other side is played without operator control. It is equally evident that the controls may be so arranged as to require the user to initiate each cycle. To remove the record after the lower side has been played, the left end of lever 60 is elevated by lifting link 72 (any suitable linkage can be used for this purpose) thereby also automatically engaging latch 66. This will lower clamp 51 and record 10, and will retain the clamp 51 in its lowered position.

Figure 2:
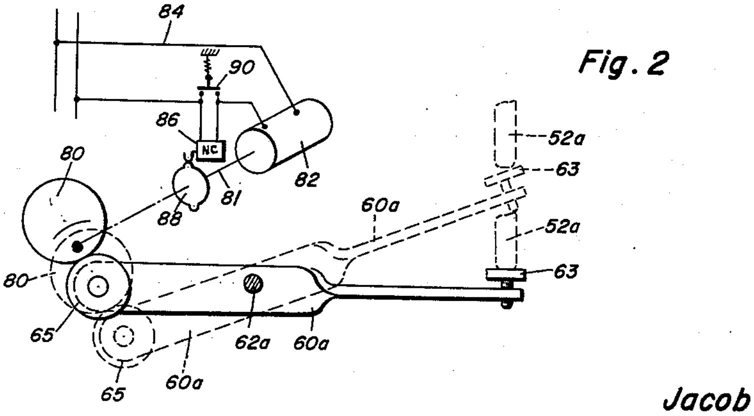
FIGURE 2 is a schematic view showing a modification of the record player in FIGURE 1 where electrical controls are used.
Figure 3:
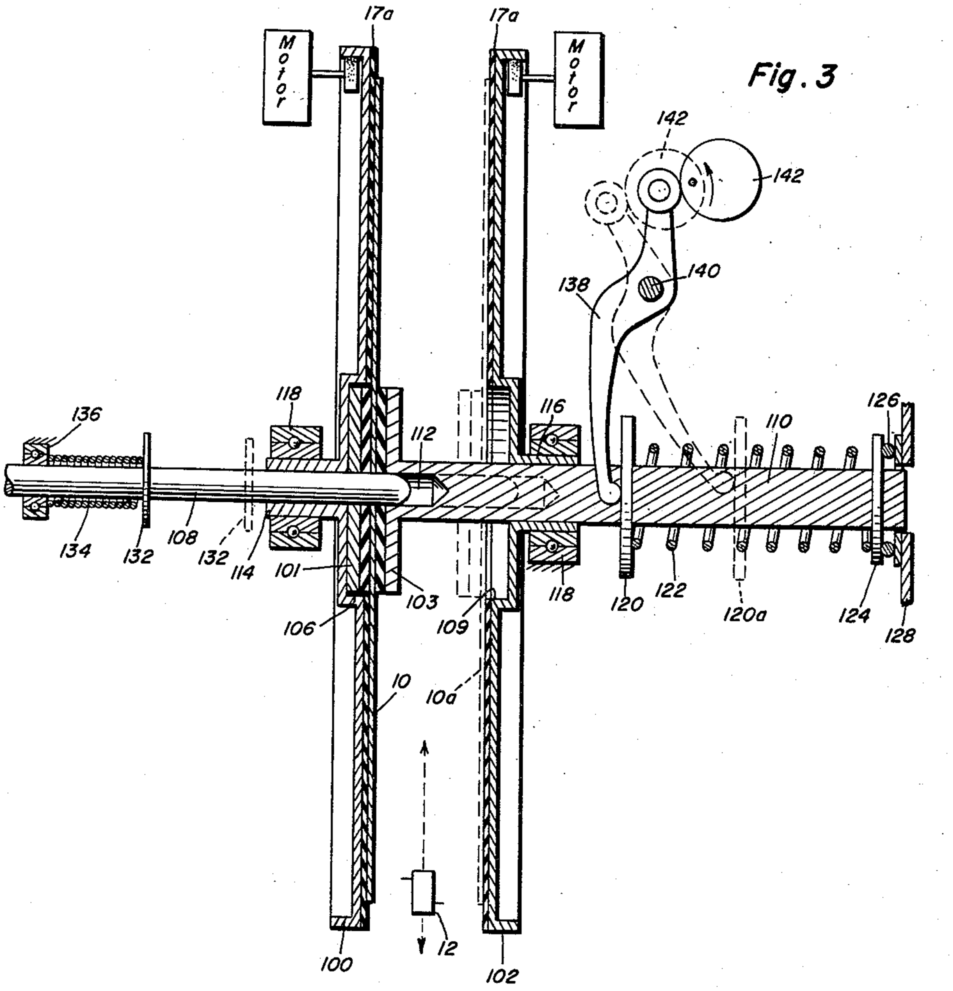
FIGURE 3 is a diagrammatic vertical sectional view of another record player in accordance with my invention.

FIGURE 2 shows a modification which, in essence, can be used in connection with the record player of FIGURE 1 and/or the record player of FIGURE 3. Lever 60*a* is mounted on a pivot pin 62*a* and has an adjustable stop 63 against which spindle 52*a* bears. The adjustable stop 63 can be used in FIGURE 1 and alternatively, stop 63 could be omitted from FIGURE 2. The opposite end of lever 60*a* has a cam follower 65 in contact with cam 80. Cam 80 is driven by the shaft 81 of motor 82 to successive positions shown in full lines and dotted lines respectively, to lower and raise spindle 52*a*.

An electric circuit 84 controls motor 82 by being operatively connected with a source of power and the motor. One line of the circuit has a normally closed switch 86 interposed therein, and the switch is opened by the lobes of cam 88 attached to shaft 81. Switch 90 is shunted across switch 86, and it may be manually closed or closed by having tone arm 12 engage the switch instead of engaging the latch lever 68.

The operation of this feature of my invention is as follows: Assume that record 10 has been placed on the lower turntable while the lever 60*a* and spindle 52*a* are lowered. Switch 90 can be manually closed or closed for a moment by the arm 12 thereby operating motor 82 which begins to turn cam 80. At the same time cam 88 is turned so that the normally closed switch 86 returns to its normal position, and motor 82 continues to operate until one of the lobes on cam 88 again opens switch 86. At this time the cam 80 will be in the dotted line position, i.e. that position at which the lever 60*a* and spindle 52*a* have elevated the record and held it against the surface of turntable 16. At the end of this cycle, the switch 90 is again energized and the record is lowered and the cycle repeated.

Figure 4:
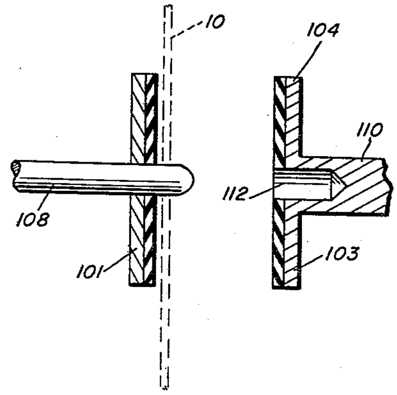
FIGURE 4 is a diagrammatic sectional view showing the action of the record-clamp of the record player in FIGURE 3.

Attention is directed to FIGURES 3 and 4 showing a form of my invention which is particularly useful in playing records while they are in a vertical plane. As in FIGURE 1, I have two turntables 100 and 102 provided with surface pads 17*a* and spaced apart a distance sufficient to allow record 10 to be conveniently inserted between the turntables and the tone arm 12 to function. In this form of my invention the record 10 is clamped at the label area by a two-part clamp 104 (FIGURE 4) instead of a one part clamp as in FIGURE 1. Secondly, the record 10 is always held between the clamp members 101 and 103, and is physically moved from one turntable to the other while it remains gripped by the two-part clamp 104.

Both turntables have central recesses 106 and 109 respectively of sufficient depth to fully accommodate respective members 101 and 103 of the clamp 104. Clamp member 101 is attached to spindle 108, and member 103 is attached to a larger diameter spindle 110 having a bore 112 (FIGURE 3) to accommodate the inner extremity of spindle 108 when clamp 104 is engaged. When engaged, the record 10 is held between the friction surfaces of the clamp.

In this form of my invention both spindles 108 and 110 respectively are axially slidable through the short hollow shafts 114 and 116 of the turntables, which are supported by bearings 118 so that the turntables can turn freely independent of each other, although in all forms of my invention I can use a single drive motor to operate both turntables or independent drive motors as shown.

A typical mechanism for clamp 104 includes a collar 120 fixed to spindle 110 and a spring 122 concentric with the spindle and engaging the collar. The opposite end of the spring engages the collar 124 which is movably mounted on spindle 110. Collar 124 either forms a part of or abuts a thrust bearing 126 which is fixed with respect to the record player frame (partially shown at 128). A fixed collar 132 on spindle 108 forms a seat for a spring 134 which is lighter and weaker than spring 122. This spring also bears against a thrust bearing diagrammatically shown at 136. Lever 138 is mounted for pivotal movement on a pivot pin 140, and one end of the lever 138 is formed as a fork to engage the collar 120. The opposite end of the lever 128 has a cam follower which engages the surface of cam 142.

The normal operation of playing a record by the mechanism in FIGURES 3 and 4 is as follows: Spindle 110 is retracted to the right as shown in FIGURE 4 and held in that position by lever 138 is dotted line position (FIGURE 3). This lever would be normally in that position when cam 142 is in the dotted line position. Spindle 108 is retracted manually to the left by manually grasping and moving disc 132 or by means of suitable levers or other mechanisms acting upon this disc. The pressure plates or clamp members 101 and 103 would then be positioned as shown in FIGURE 4. Thus, record 10 can easily be inserted between the two turntables and placed so that its center opening slipped over shaft 108 as shown by record 10 in FIGURE 4. Shaft 108 would then be released to slide to the right under the action of spring 134 until the record was pinched into position *10a* (FIGURE 3). The tone arm 12 would then be operated to bring the stylus against the record, either manually or automatically and the record would be played on its left side as seen in FIGURE 3.

When this side of the record has been finished, the tone arm stylus is lifted off the record and moved out of the space between the turntables. Cam 142 would make one-half a revolution, by any suitable mechanism such as, for example, shown in FIGURE 2, thereby permitting spring 122 to expand and move upon spindles 108 and 110 to the left and into the position shown in solid lines in FIGURE 3. It should be remembered that spring 122 is stronger than spring 134 so that the record remains clasped by members 101 and 103. The record is now placed against the soft surface of the turntable 100 and the tone arm 12 can now enter between the turntables and be made to contact the right side of the record.

At the end of the cycle the mechanism could be restored to the initial condition or the record can again be played on the left side if this should be desirable.

It is understood that various changes, alterations and modifications may be made in the embodiments of the invention shown in the drawings and described, without departing from the protection of the following claims.

I claim:

1. In a compact record player to play both sides of a record without turning the record over, a first turntable to support the record while playing the first side of the record, means supporting and fixedly retaining said first turntable in a first record-playing plane of rotation, a second turntable, means supporting said second turntable in a second record-playing plane of rotation, said turntables remaining in their respective record-playing planes during the time that both sides of the record are being played and also in the transition period between playing the two sides of the record, said second turntable being approximately parallel and juxtaposed to said first turntable and adapted to engage and rotate the record while the second side is being played, whereby a portion of the record larger than the label area engages the record and also the inertia of each turntable provides flywheel action during the playing of the record, means to physically push the record from the first turntable to the second turntable while both turntables remain in their said record-playing planes, said record pushing means so moving the record while the record remains substantially parallel to both record-playing planes, and means to track the successive sides of the record while in first and while in the second playing positions.

2. The record player of claim 1 wherein said record moving means include means engaging a large part of the label area of the record for displacing the record in a straight-line movement from one turntable to the other in the space between turntables.

3. The record player of claim 2 wherein said record displacing means include a clamp member having a surface substantially parallel to said turntables and of a size to contact the major portion of the labeled area of the record, and said clamp member being movable in a manner to press the record by bearing against the label area thereof, against one of the turntables.

4. In a record player, a first turntable to rotate and support a record, a second turntable to rotate and support the record and juxtaposed to said first turntable, each turntable having an area substantially as large as the record supported by said turntables, means at the center of at least one of said turntables for engaging the label area of the record and for moving the record from the surface of one turntable to the surface of the other turntable, at least one of said turntables having a recess at the center part thereof, and said means for moving the record from one turntable to the other being disposed in said recess when the record engages said first turntable and is movable out of the recess in a manner to press the record against the second turntable.

5. In a record player, a first turntable, a second turntable, both of said turntables having an area to support substantially the entire record, means mounting said turntables in face-to-face relationship and for rotation to rotate the record, axially movable means at the axis of rotation of said turntables for engaging the label area of the record and holding the record against one of said turntables when said movable means are in one position, and said movable means being axially movable to a second position at which the record moves against the other of said turntables to successively play the first and second sides of said record without physically turning over said record.

6. The subject matter of claim 5 wherein both of said turntables have confronting recesses at the centers thereof, and said axially movable means has a pressure member movable into and from said recesses.

7. In a record player for playing both sides of a single record without turning over the record, the improvement comprising a first turntable, a second turntable in face to face relationship with the first turntable, said turntables being full area turntables to support the major outer areas of the record, means to rotate said turntables, moving means engageable with the record for displacing the record from one turntable to the other to be in successive first and second playing positions, and said record moving means including a clamp member having a surface which contacts a large part of the label area of the record and presses the record against one turntable while one side of the record is being played, and means maintaining said turntables in respective planes of rotation during the time that the sides of the record are being played and also during the time that said moving means move the record from one turntable to the other.

8. In a record player for successively playing both sides of a record, the combination of a first and a second turntable which remain in fixed planes with a successive turntable engaging a respective side of the record during the successive playing of the record sides, and means movable in a direction substantially normal to said turntables and operative while said turntables remain in said planes for physically pushing the record in a rectilinear path from one turntable to the other by engaging at least one half of the label area of the record and moving the record axially of the turntables while said turntables remain in said fixed planes.

9. In a record player for successively playing the sides of a record without turning over the record in positioning the record to play either of the two sides of the record, the improvement comprising a first and a second turntable, means maintaining said turntables in fixed record-playing planes during the time that said sides are being played and also during the time that the record is being changed from one turntable to the other, and means movable from the area of one turntable to the area of the other turntable for pushing the record from the first turntable to the second turntable and for holding the record against said second turntable during the playing of one side thereof.

10. The subject matter of claim 9 wherein said pushing means include a pressure member axially movable with respect to said turntables to engage a portion of the label area of the record.

11. The subject matter of claim 9 wherein said pushing means include an element coaxial with one of said turntables, and a pressure member attached to said element and engaging the label area of the record.

12. In a record player for sequentially playing two sides of a record without turning over the record between the playing of the two sides, said record player comprising a first turntable to engage a major portion of the area of one side of the record, means fixedly retaining said first turntable in a fixed first record-playing plane of rotation during the time that both sides of the record are being played, a second turntable spaced from said first turntable and having an area sufficient to engage the major portion of the area of the other side of the record, means retaining said second turntable in a second record-playing plane of rotation during the time that both sides of said record are being played, thereby establishing two separate record-playing planes of rotation which are retained during the playing of the respective sides of the record, means movably mounted relative to said turntables for moving the record from one fixed plane to the other plane after one side of the record has been played and while said turntables remain in said record-playing planes, and said record moving means including means engaging the record label area and moving the record flatwise from the first turntable to the second turntable and holding the record pressed against the second turntable.

13. In the record player of claim 12, said record moving means including a spindle coaxial with said turntables, a member fixed to said spindle and having a substantial surface engaging the label of the record, and means to move said spindle and member in a path perpendicular to said record playing planes.

14. The subject matter of claim 12 wherein said record moving means include an axially movable spindle assembly having a record label-contacting member, and means to move said assembly and member normal to said planes and to press the record in engagement with one of said turntables while one side of the record is being played.

15. The subject matter of claim 14 wherein said assembly moving means also press the record in engagement with the other turntable while the other side of the record is being played.

16. In a record player, a pair of turntables for the record sides, means retaining said turntables in fixed parallel planes during and between the time that the record sides are being played, and means coaxial with said turntables for moving the record from one turntable to the other, and means operatively connected with said record moving means for clamping the record against the last-mentioned turntable.

References Cited in the file of this patent

UNITED STATES PATENTS

| | | |
|---|---|---|
| 2,658,761 | Morris | Nov. 10, 1953 |
| 2,944,826 | Essen | July 12, 1960 |
| 2,960,340 | Seidel et al. | Nov. 15, 1960 |

FOREIGN PATENTS

| | | |
|---|---|---|
| 395,137 | Great Britain | July 13, 1933 |
| 878,049 | Great Britain | Sept. 20, 1961 |